United States Patent
Verheem (10) Patent No.: US 8,967,514 B2
(45) Date of Patent: Mar. 3, 2015

(54) DUAL FOOD CHOPPER

(76) Inventor: Johann B. Verheem, Encinitas, CA (US)

( * ) Notice: Subject to any disclaimer, the term of this patent is extended or adjusted under 35 U.S.C. 154(b) by 170 days.

(21) Appl. No.: 13/638,830

(22) PCT Filed: Mar. 30, 2011

(86) PCT No.: PCT/US2011/030503
§ 371 (c)(1),
(2), (4) Date: Dec. 19, 2012

(87) PCT Pub. No.: WO2011/123522
PCT Pub. Date: Oct. 6, 2011

(65) Prior Publication Data
US 2013/0092773 A1    Apr. 18, 2013

Related U.S. Application Data

(60) Provisional application No. 61/319,170, filed on Mar. 30, 2010.

(30) Foreign Application Priority Data

Mar. 30, 2010  (CN) .......................... 2010 3 0134600

(51) Int. Cl.
*A47J 43/00*    (2006.01)
*A47J 43/044*   (2006.01)
(Continued)

(52) U.S. Cl.
CPC ............... *A47J 43/044* (2013.01); *B26D 3/26* (2013.01); *B26D 5/10* (2013.01)
USPC ............................ 241/169; 241/272; 241/283

(58) Field of Classification Search
CPC ............. A47J 43/04; B26B 3/04; B26D 3/26
USPC ......... 241/168, 169, 169.1, 272, 283; 99/509, 99/510
See application file for complete search history.

(56) References Cited

U.S. PATENT DOCUMENTS 2,782,826 A * 2/1957 Zysset ........................... 241/272
2,787,308 A * 4/1957 Popeil ........................... 241/272
(Continued)

OTHER PUBLICATIONS

International Bureau, International Search Report for International Application No. PCT/US2011/030503, Oct. 6, 2011, pp. 1-2, Geneva, Switzerland.
(Continued)

*Primary Examiner* — Shelley Self
*Assistant Examiner* — Leonel Vasquez
(74) *Attorney, Agent, or Firm* — Gordon Rees Scully Mansukhani LLP (57) ABSTRACT

A food chopper includes a housing and a central shaft supported in a vertically movable configuration inside the housing. The central shaft has a lower end with at least one center blade, an upper end operably connected to a plunger, and a middle segment with two lateral arms. Two blade assemblies are rotatably connected to the two lateral arms of the central shaft. Each of the two blade assemblies includes a shaft connected to an outer blade. The vertical motion of the central shaft is converted into rotational motion of the blade assemblies using a conversion mechanism operably connected to each of the two blade assemblies. Depressing the plunger causes the at least one center blade of the central shaft to move vertically downward within the housing and the two outer blades to move vertically downward and rotate within the housing.

1 Claim, 11 Drawing Sheets

(51) Int. Cl.
*B26D 3/26* (2006.01)
*B26D 5/10* (2006.01)

(56) References Cited

U.S. PATENT DOCUMENTS

| | | | | |
|---|---|---|---|---|
| 2,872,958 | A | * | 2/1959 | Popeil .......................... 241/272 |
| 2,895,520 | A | * | 7/1959 | Morris ............................ 83/156 |
| 3,083,747 | A | * | 4/1963 | Zysset .......................... 241/272 |
| 3,587,692 | A | * | 6/1971 | Nelson .......................... 241/270 |
| 3,933,315 | A | * | 1/1976 | Popeil .......................... 241/166 |
| 4,192,470 | A | * | 3/1980 | Hartmann ..................... 241/169 |
| 4,967,970 | A | * | 11/1990 | Michel .......................... 241/169 |
| 7,100,854 | B2 | * | 9/2006 | Aby-Eva et al. ............... 241/169 |
| 7,152,821 | B2 | * | 12/2006 | Aby-Eva et al. ............... 241/169 |
| 7,258,292 | B2 | * | 8/2007 | Cheung ......................... 241/169 |

OTHER PUBLICATIONS

International Bureau, International Preliminary Report on Patentability Chapter I for International Application No. PCT/US2011/030503, Oct. 2, 2012, pp. 1-4, Geneva, Switzerland.

International Bureau, Written Opinion of the International Search Authority for International Application No. PCT/US2011/030503, Sep. 30, 2012, pp. 1-3, Geneva, Switzerland.

* cited by examiner

DUAL FOOD CHOPPER

CROSS-REFERENCE TO RELATED APPLICATIONS

This application is a U.S. national stage entry of international application no. PCT/US2011/30503 filed Mar. 30, 2011, which claims priority to U.S. Provisional Patent Application No. 61/319,170 filed Mar. 30, 2010 and entitled "Food Chopper," and to China Design Application No. 201030134600.X filed Mar. 30, 2010. The contents of both of these prior applications are incorporated herein by reference in their entirety as if set forth verbatim.

FIELD

The following description relates generally to food preparation devices, and more particularly to a multi-bladed food chopper.

BACKGROUND

Food choppers are well known alternatives to using a knife to cut or chop foods such as vegetables, fruit, cheese, nuts, etc. Although electric choppers are available, many people prefer a smaller and less expensive manual food chopper. One popular type of manual food chopper is the plunger chopper. In the plunger chopper, a housing encloses a rotating chopping blade with a shaft. A plunger emerges from the top of the housing and has a lower end which interacts with the shaft of the chopping blade so that each time the plunger is depressed, the chopping blade rotates and moves down to cut food underneath the housing. An internal spring causes the plunger to return to the starting position after each press. Mechanisms for converting the linear motion of the plunger into the rotational motion of the chopping blade are well known in the art. For example, one type of a plunger-style manual food chopper is found in U.S. Pat. No. 3,933,315, which is incorporated herein by reference.

One problem with existing plunger-style food choppers is their round shape. Conventional plunger choppers have round chopping footprints due to the rotation of the blade during each chop. As used herein, the term "chopping footprint" refers to the region under a chopping device in which the chopping blades may fall when the plunger is depressed. Even if the housing of the chopper is formed as a different non-round shape, the chopping footprint will always be round as a result of the rotating blade. This limits the size and types of foods that the chopper can be used to chop. Large or unusually shaped items must be cut into smaller pieces in order to fit within the chopping footprint. For example, it is impossible to chop a cucumber using a conventional plunger chopper unless the cucumber is first cut into pieces that fit within the chopping footprint. Furthermore, simply making the chopping blade larger is not a satisfactory solution because the device becomes too large and takes up too much storage space.

Accordingly, there is a need for a manual food chopper with a larger and non-round chopping footprint.

SUMMARY

The embodiments disclosed below satisfy this need. The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a food chopper includes a housing and a central shaft supported in a vertically movable configuration inside the housing. The central shaft has a lower end with at least one center blade, an upper end operably connected to a plunger, and a middle segment with two lateral arms. Two blade assemblies are rotatably connected to the two lateral arms of the central shaft. Each of the two blade assemblies includes a shaft connected to an outer blade. A means for converting vertical motion of the central shaft into rotational motion of the blade assemblies, such as a conversion mechanism operably connected to each of the two blade assemblies, is provided. Depressing the plunger causes the at least one center blade of the central shaft to move vertically downward within the housing and the two outer blades to move vertically downward and rotate within the housing.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

In one aspect of the disclosed embodiments, a food chopper has two rotating outer blades separated by a non-rotating center blade. All of the blades are mounted within a housing and are operably connected to a central shaft which is supported in a vertically movable configuration inside the housing. The central shaft is connected to a plunger so that when the plunger is depressed the two rotating outer blades and the non-rotating center blade move downward and the two rotating outer blades also rotate. By providing two rotating outer blades separated by anon-rotating center blade, a relatively large and non-round chopping footprint is achieved.

Figure 1:
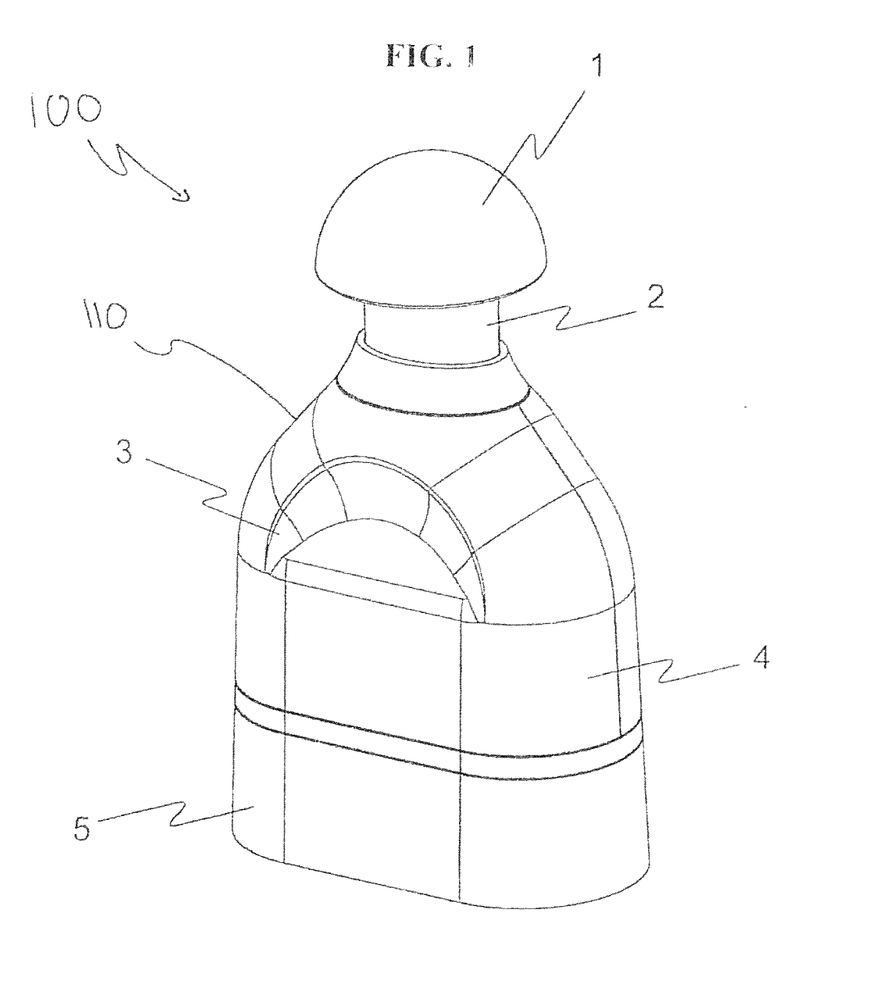
FIG. 1 is a perspective view of one embodiment of a food chopper, showing the plunger in the starting position.
Figure 1A:
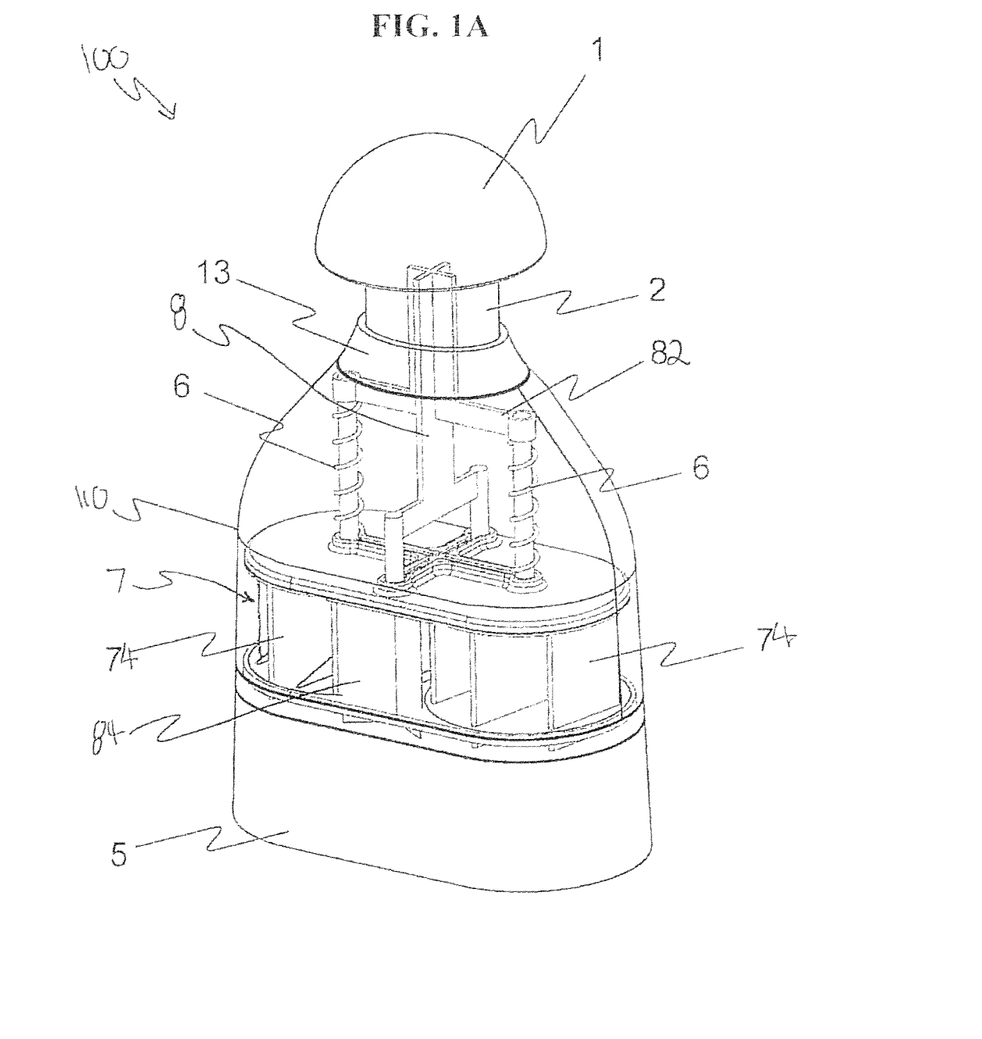
FIG. 1A shows the view of FIG. 1 with the housing made transparent.
Figure 2:
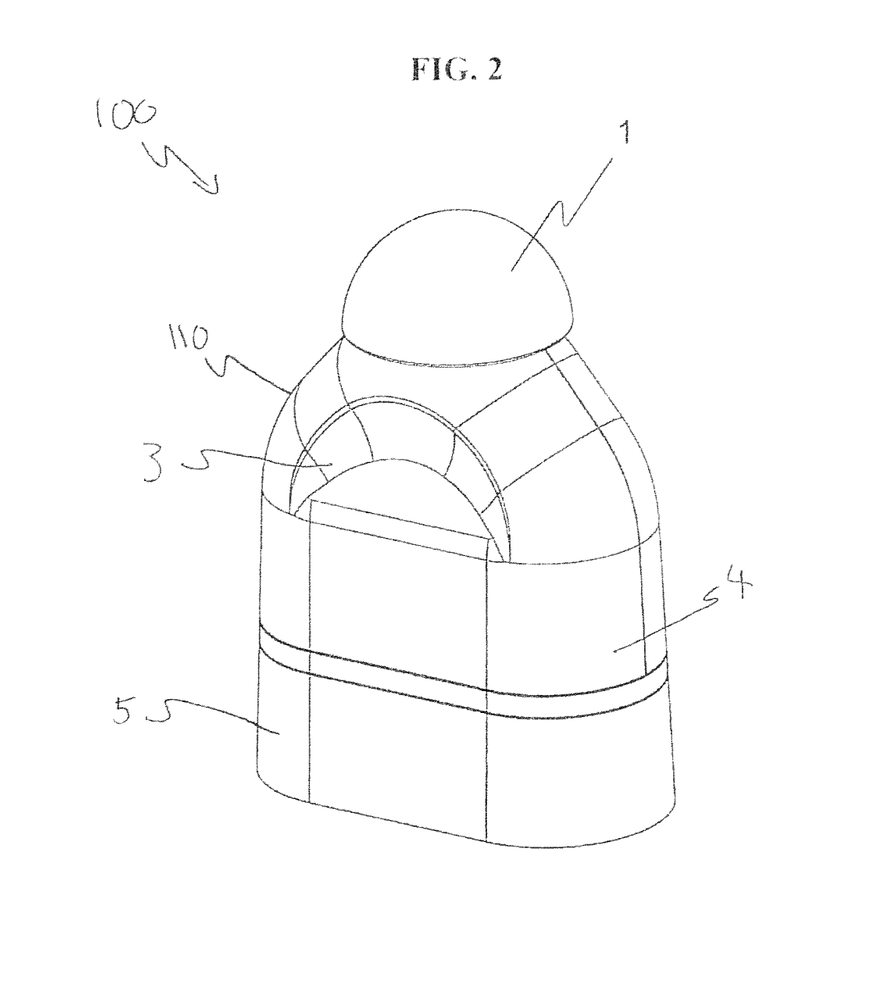
FIG. 2 is a perspective view of the food chopper of FIG. 1, showing the plunger in the depressed position.

FIGS. 1 and 1A show a perspective view of one embodiment of food chopper 100. Food chopper 100 includes housing 110 with handle 3, blade chamber 4, and chopping chamber 5. Any or all portions of housing 110 may be transparent in order to make the inner mechanisms or the food being chopped visible to the user. Plunger 1 extends from the upper end of housing 110 and is attached to plunger shaft 2. FIGS. 2 and 2B show a perspective view of food chopper 100 when plunger 1 is depressed.

Figure 3:
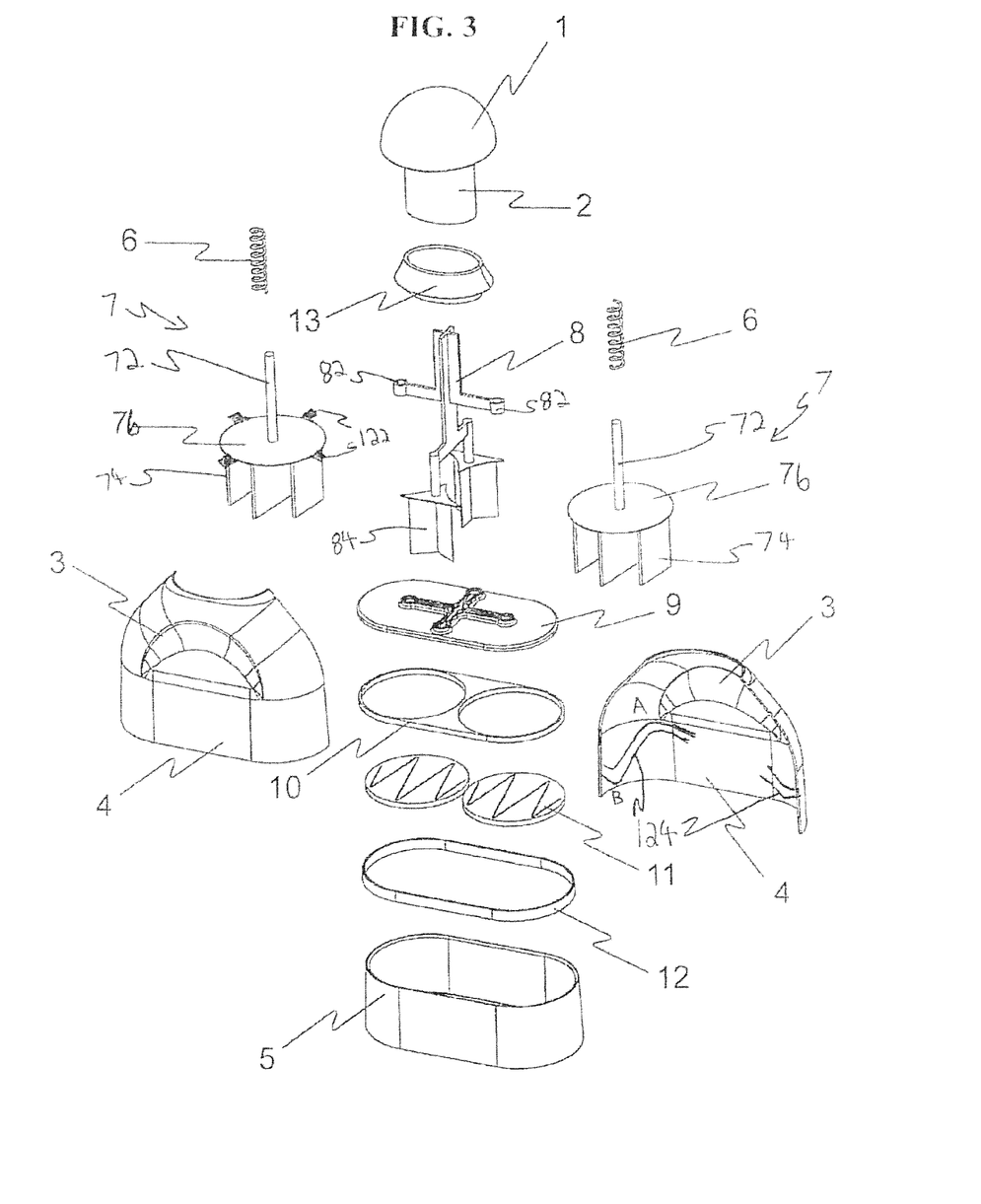
FIG. 3 is an exploded view of the food chopper of FIG. 1.

FIG. 3 shows an exploded view of food chopper 100. Central shaft 8 has an upper end operably connected to plunger 1. It is to be understood that central shaft 8 need not be attached or fixedly connected to plunger 1. Rather, it is possible that plunger shaft 2 only comes into contact with the upper end of central shaft 8 while plunger 1 is being depressed. All that is required is that a downward force applied to plunger 1 results in a downward force applied to central shaft 8. Central shaft 8 includes lateral arms 82 and non-rotating center blade 84 at its lower end.

Figure 2A:
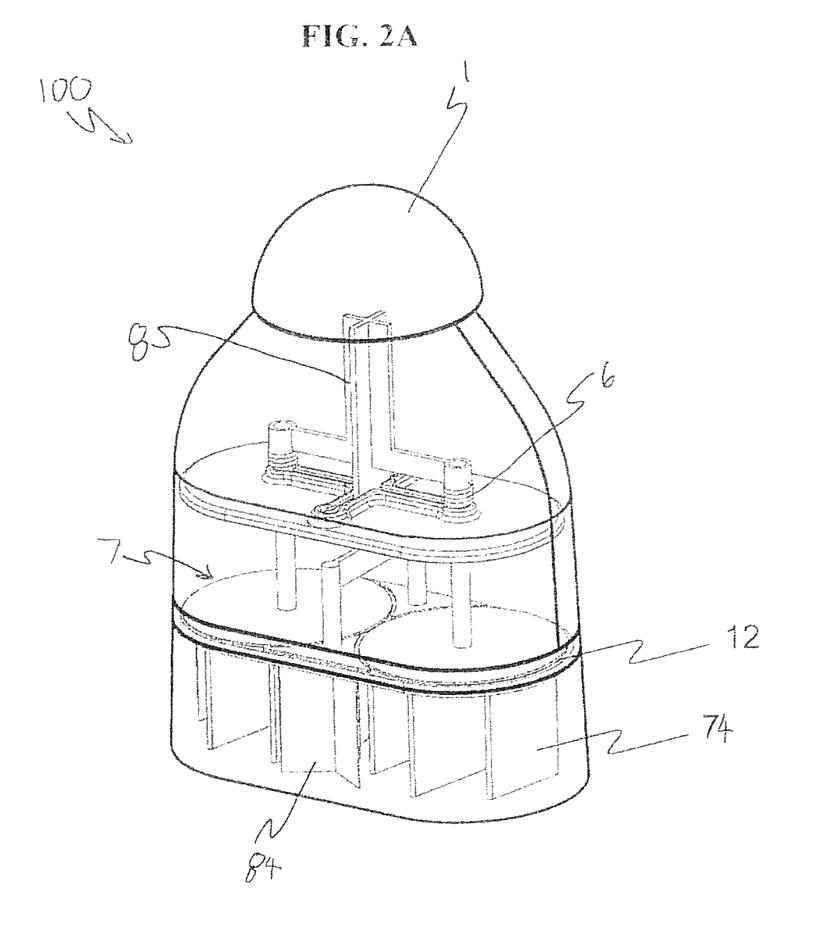
FIG. 2A shows the view of FIG. 2 with the housing made transparent.

Two rotating blade assemblies 7 are provided inside housing 110. Each blade assembly 7 includes blade shaft 72 and blade 74 (which may be convoluted) which are each mounted to blade foundation 76. Blade 74 is rigidly mounted on blade foundation 76. Blade shaft 72 may be fixedly or rotatably mounted on blade foundation 76. Each blade shaft 72 is mounted to one lateral arm 82 of central shaft 8. If blade shaft 72 is rotatably mounted on blade foundation 76, then blade shaft 72 is fixedly connected to lateral arm 82. If blade shaft 72 is fixedly mounted on blade foundation 76, then blade shaft 72 is rotatably connected to lateral arm 82. In any configuration, central shaft 8 and blade assemblies 7 move up and down in unison in response to movement of plunger 1. Springs 6 may be mounted on each blade shaft 72 so that they are compressed between blade foundations 76 and lateral arms 82 when plunger 1 is depressed (as shown in FIGS. 2 and 2A). After force is removed from plunger 1, the compressed springs 6 urge central shaft 8 upwards and return plunger 1 to its starting position (shown in FIGS. 1 and 1A). Also provided in housing 110 are central shaft gasket 9, blade assembly gasket 10, chopping chamber gasket 12, food ejector 11 and collar 13.

Figure 4:
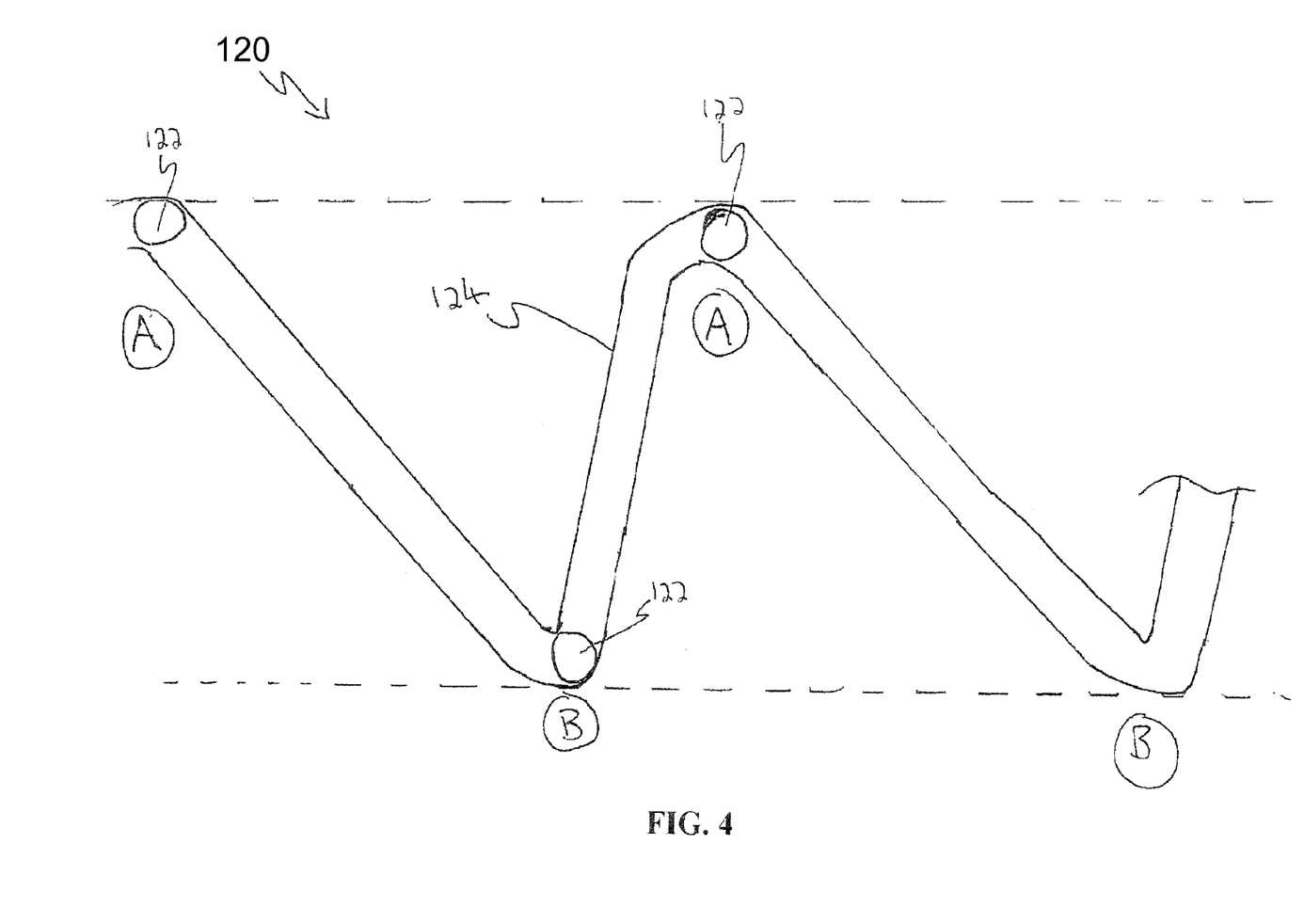
FIG. 4 is schematic view of a conversion mechanism for use with the chopper of FIG. 1.
Figure 5:
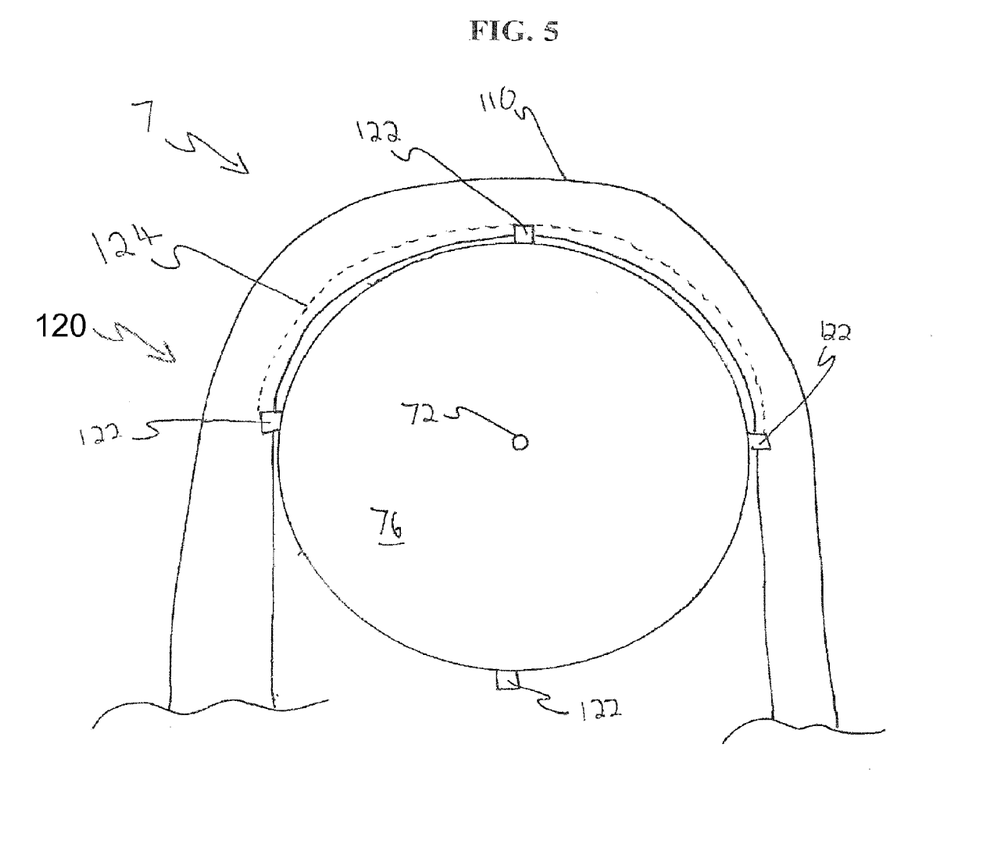
FIG. 5 is a top view of a blade assembly incorporating the conversion mechanism of FIG. 4.

Food chopper 100 also includes means for converting vertical linear motion of plunger 1 and central shaft 8 into rotational motion of blade assemblies 7 and blades 74. For example, one means for converting vertical linear motion into rotational motion is conversion mechanism 120, shown in FIGS. 3 and 4. Conversion mechanism 120 translates the linear vertical motion of plunger 1 into rotational motion of blade assemblies 7 (including outer blades 74). Mechanisms and methods for converting linear motion into rotational motion have long been well known in the art and are not the subject of the present disclosure. Conversion mechanism 120 is only one example of a mechanism that could be used as a means to convert the linear motion of plunger 1 to rotational motion of blade assemblies 7. Conversion mechanism 120 includes peg 122 and groove 124. Pegs 122 may be incorporated into blade assembly 7, for example extending radially from blade foundation 76 as shown in FIG. 5. Groove 124 is formed into the inner wall of housing 110 (or into the wall of an internal frame surrounding blade assemblies 7). The upper and lower dotted lines in FIG. 4 represent the top and bottom points of the vertical travel of central shaft 8 (and each blade assembly 7). Peg 122 is slidably engaged with groove 124 and is thereby constrained to move only within groove 124. In FIG. 4, when peg 122 is in position A, blade assemblies 7, central shaft 8, and plunger 1 are all at the top of their vertical travel ranges. It can be seen that when plunger 1 is depressed so that central shaft 8 and blade assemblies 7 begin to move straight down, peg 122 is forced by groove 124 to move diagonally down. Because peg 122 is attached to blade assembly 7, blade assembly 7 is forced to rotate as peg 122 travels along groove 124.

Once peg 122 reaches position B in FIG. 4, plunger 1, central shaft 8 and blade assemblies 7 are each at the bottom of their vertical ranges of travel. Accordingly, once peg 122 reaches position B, the food under food chopper 100 has been chopped one time. When force is removed from plunger 1, springs 6 urge central shaft 8, blade assemblies 7 and plunger 1 upward. If the segment of groove 124 leading upward from position B to position A is slanted relative to vertical, then blade assembly 7 will also rotate on its return to its starting position. One purpose of causing blade assemblies 7 to rotate during each press of plunger 1 is to ensure that the food under food chopper 100 is not chopped in the exact same place every time. By rotating blade assemblies 7 during each stroke, it is ensured that blades 74 of blade assemblies 7 will strike the food at a different orientation on each impact. Another purpose of forcing blade assemblies 7 to rotate is to help distribute and mix food in chopping chamber 5. During each chopping stroke, the food is pushed slightly to one side as blades 74 rotate. This both helps to mix the food being chopped as well as slightly moving the food under non-rotating blade 84 of central shaft 8.

Figure 6:
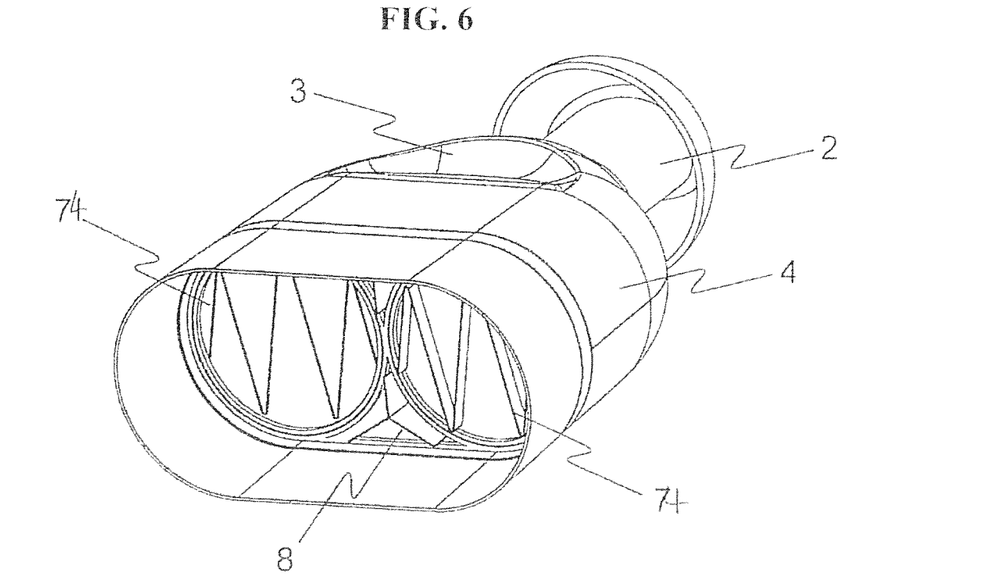
FIG. 6 is a perspective bottom of view of the chopper of FIG. 1, showing the blades in the starting position.
Figure 7:
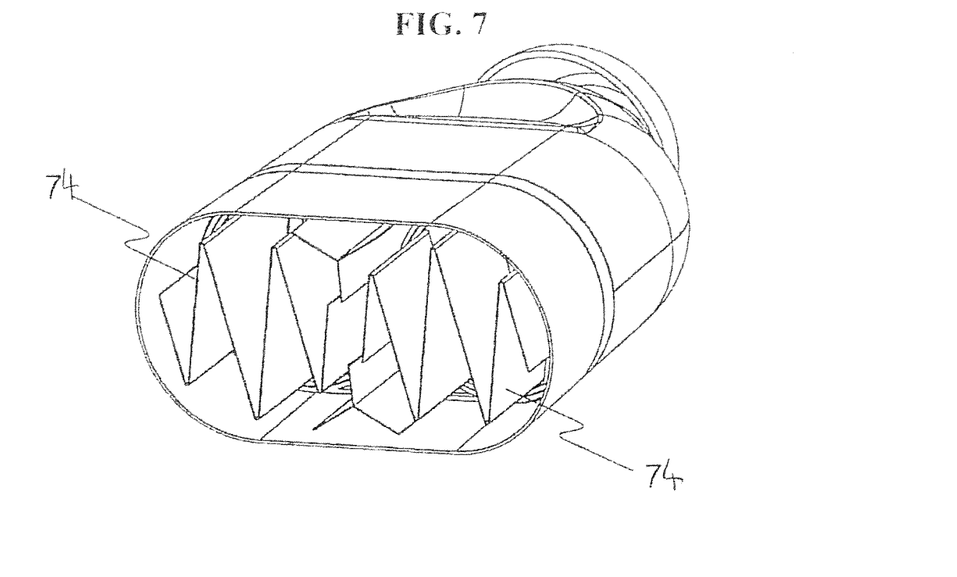
FIG. 7 is a perspective bottom of view of the chopper of FIG. 1, showing the blades in the lowered position.
Figure 8:
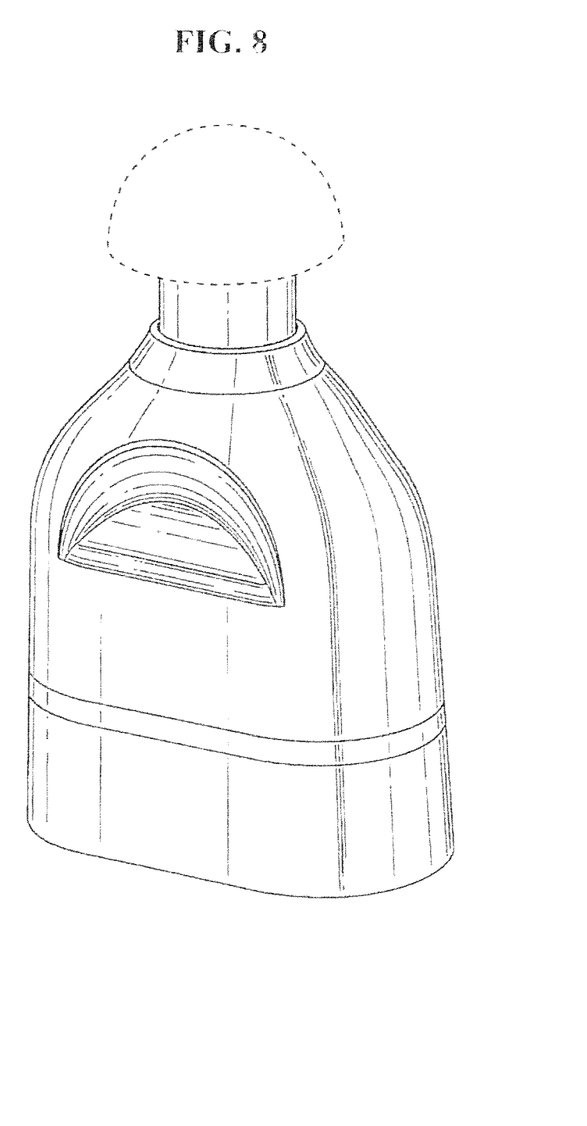
FIG. 8 is a perspective view of the food chopper of FIG. 1 with shading to indicate contours, and with the plunger shown in dotted lines.
Figure 9:
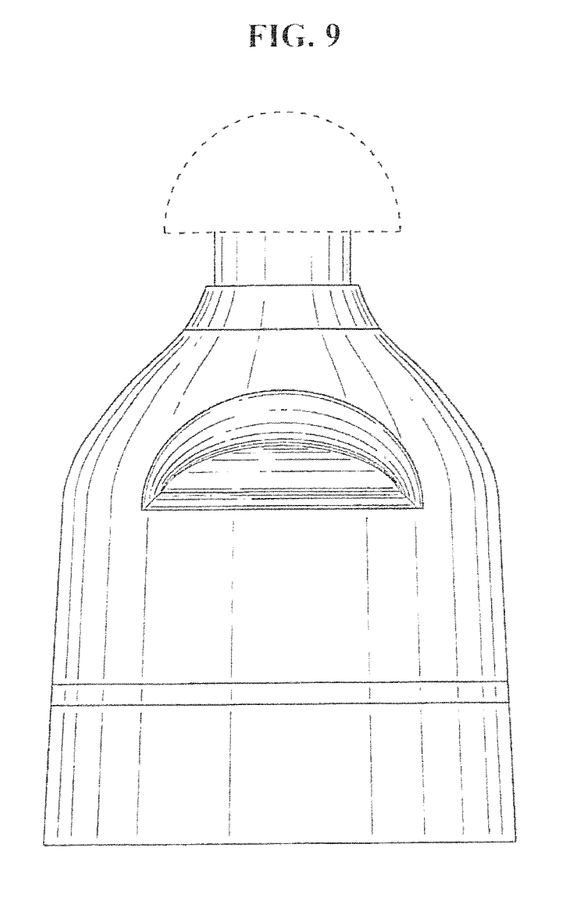
FIG. 9 is a front (or back) view of the food chopper of FIG. 8.
Figure 10:
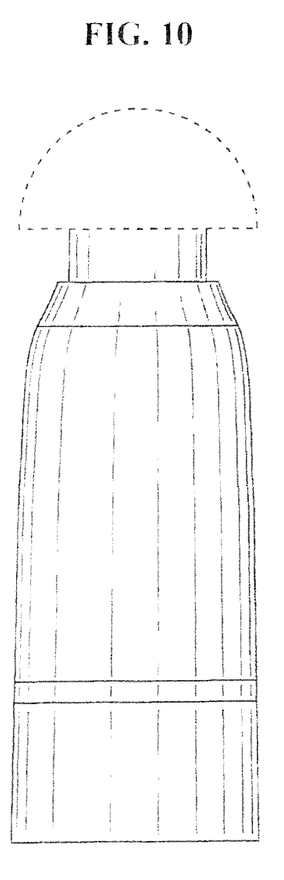
FIG. 10 is a side (left or right) view of the food chopper of FIG. 8.
Figure 11:
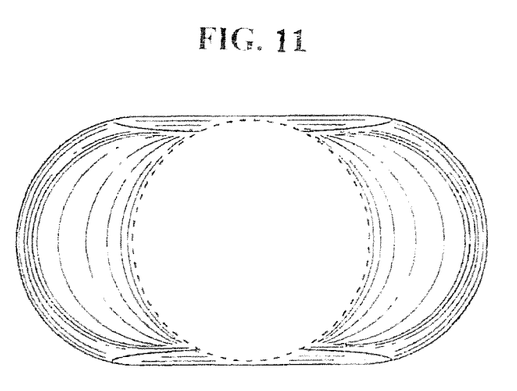
FIG. 11 is a top view of the food chopper of FIG. 8.
Figure 12:
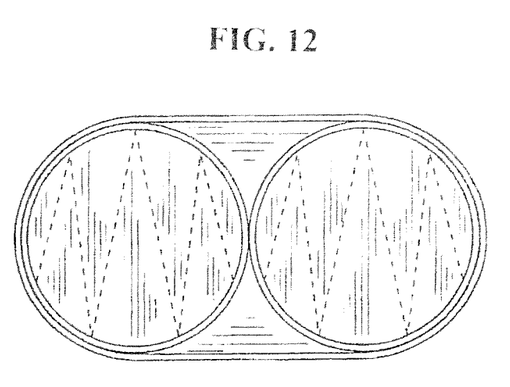
FIG. 12 is a bottom view of the food chopper of FIG. 8.

The unique configuration of at least two blades 74, which may be at least two rotating outer blades, separated by non-rotating center blade 84 gives food chopper 100 an unusually large chopping footprint. As can best be seen in FIGS. 6 and 7, food chopper 100 has a generally oval-shaped chopping footprint. This chopping footprint is not only larger than the footprint of a single rotating blade chopper, but also has a more practical shape as many fruits and vegetables (such as bananas, carrots, cucumbers, celery, etc.) are longer in one dimension than others. By matching the shape of the chopping footprint to the shape of many of the foods commonly chopped, food chopper 100 allows more food to be chopped more quickly and easily and with less prep work such as cutting food down to a size that fits within the chopping footprint.

The materials used to make food chopper 100 are not critical. Blades 74 and 84 may be made from stainless steel, while central shaft 8 and blade shafts 72 may be made from any suitable metal or other material. Housing 110 and plunger 1 may be made from a plastic such as polystyrene or any other suitable polymer. Portions of housing 110, in particular chopping chamber 5, may be transparent. FIGS. 8-12 show one possible external appearance of food chopper 100 and in particular housing 110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A food chopper, comprising:
   a housing;
   a central shaft supported in a vertically movable configuration inside the housing, the central shaft comprising a lower end with at least one center blade, an upper end operably connected to a plunger, and a middle segment with two lateral arms;
   two blade assemblies rotatably connected to the two lateral arms of the central shaft, the two blade assemblies each comprising a blade shaft connected to an outer blade; and
   means for converting vertical motion of the central shaft into rotational motion of the two blade assemblies;
   wherein depressing the plunger causes the at least one center blade of the central shaft to move vertically downward within the housing and the two outer blades to move vertically downward and rotate within the housing.

* * * * *